United States Patent
Fujisawa

(10) Patent No.: US 6,956,613 B2
(45) Date of Patent: Oct. 18, 2005

(54) PHOTOGRAPHING DEVICE

(75) Inventor: Toshiki Fujisawa, Machida (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 10/448,490

(22) Filed: May 29, 2003

(65) Prior Publication Data

US 2003/0223012 A1 Dec. 4, 2003

(30) Foreign Application Priority Data

Jun. 3, 2002 (JP) ......................................... 2002-161248

(51) Int. Cl.$^7$ ............................................. H04N 5/225
(52) U.S. Cl. ................................ 348/372; 348/231.99
(58) Field of Search ........................ 348/372, 231.1–3, 348/222, 374, 231, 334; 714/22; 345/211; 346/287; 396/287

(56) References Cited

U.S. PATENT DOCUMENTS

| | | | | |
|---|---|---|---|---|
| 5,541,656 A | * | 7/1996 | Kare et al. ............. | 348/333.02 |
| 5,845,166 A | * | 12/1998 | Fellegara et al. ........... | 396/429 |
| 5,935,259 A | * | 8/1999 | Anderson .................... | 714/22 |
| 5,970,260 A | * | 10/1999 | Nakayama et al. ........... | 396/80 |
| 5,986,700 A | * | 11/1999 | Wakui .................... | 348/231.8 |
| 6,088,182 A | * | 7/2000 | Taki et al. .................... | 360/71 |
| 6,115,557 A | * | 9/2000 | Maeda et al. ............... | 396/287 |
| 6,346,937 B1 | * | 2/2002 | Sasaki et al. ............... | 348/372 |
| 6,588,667 B1 | * | 7/2003 | Nakano et al. ........ | 235/462.15 |
| 6,767,288 B1 | * | 7/2004 | Kakuda et al. ............... | 463/44 |
| 2001/0028397 A1 | * | 10/2001 | Nakamura .................. | 348/222 |

* cited by examiner

Primary Examiner—David L. Ometz
Assistant Examiner—Gevell Selby
(74) Attorney, Agent, or Firm—Cohen, Pontani, Lieberman & Pavane

(57) ABSTRACT

CPU 10 generates memory card loading/unloading information, based on memory card loading/unloading detection signals inputted from memory I/O 16. Memory I/O 16 works even when the power supply is in the OFF condition. CPU 10 also generates memory card control information of loaded memory cards A 5 and B 6, and stores it in RAM 11.

When the power supply is re-activated, CPU 10 recognizes that memory card control information was stored in RAM 11 under the power OFF condition, generates memory card control information of loaded memory cards A 5 and B 6, and compares that with memory card control information which was stored in RAM 11 when the power was turned off, and then judges whether loaded memory cards A 5 and B 6 are the same as the cards which were used when the power was turned off.

10 Claims, 3 Drawing Sheets

PHOTOGRAPHING DEVICE

BACKGROUND OF THE INVENTION

The present invention relates to a photographing device.

When a digital camera is used for picturing an image, it is possible to check the result of the intended image on the spot, and further, to easily print out image data recorded in a memory card, using a personal computer, and accordingly digital cameras have recently become very popular. Due to this, users demand more features in their digital camera, and there is tendency for manufacturers of digital cameras to include more and more higher photographing functions, and further, some of these additional functions serve other than photographing functions, to compete more effectively against their competitors. Thus higher functional improvement and multifunctional improvement have rapidly progressed for digital cameras.

However, in order to enhance these higher functional improvements and also multifunctional improvement for conventional digital cameras, performance of the control system of the digital camera is required to be higher, and thereby, processing burden for the CPU (central processing unit) which is the center of the control system and for memory, has a tendency to become excessive.

Further the user, who requires these higher functions and multifunctional features, considers ease of operation to be very important, and thereby, encouraging processing burdens to become heavier. The warm-up time which the user must wait from the moment when a switch is turned on to the moment for the camera to be ready for photography and the associated data writing time become longer, which can result in the photographer losing the intended chance, which can be very frustrating for the user.

For example, concerning a large amount of flash memory, which is employed as memory cards to record image data in digital cameras, management procedures (such as procedures for initialization, data writing, data erasing, and data rewriting) of the internal memory area of the flash memory are very complicated, which are large factors to reduce the processing speed in each working mode of a digital camera.

SUMMARY OF THE INVENTION

The object of the present invention is to disperse the processing loads for the recording media such as the flash memory in the digital camera so that the influence on each operational mode is reduced and the processing speed of each mode is heightened, and further the objects are to prevent inconsistency of information caused by changing the battery or memory card, and to change the performing step of the above-mentioned management procedures to reduce the above-mentioned warm-up time.

The objects of the invention can be attained by employing either one of the following structures:

Structure 1

A photographing device, composed of:

A power ON/OFF detecting section to sense an activated condition and a de-activated condition of the power supply;

a control information generating section for generating control information to control the use of conditions of a recording medium to record photographed images, when power OFF is detected; and a control information memorizing section to memorize and preserve control information, when the power supply is de-activated.

According to Structure 1, when the power ON/OFF detecting section senses the de-activated condition of the power supply, the control information generating section generates control information to control the condition of the recording medium to record the photographed images, and the control information memorizing section memorizes and preserves the control information, in the condition that the power supply is de-activated.

Therefore, when the power supply is reactivated, it is possible to recognize the installation condition and use condition of the recording medium, by using the control information which was memorized while the power supply was de-activated, and thereby, it is possible to reduce the processing time interval between the moment of a power supply-activation and the image capturing moment.

Structure 2

The photographing device described in Structure 1, is composed of:

a battery house section which houses a battery detachably, and a battery house lid section which can be opened or closed to insert or remove the battery, into or from the battery house section, wherein the OFF condition is sensed, when the power ON/OFF detecting section senses an open/shut operation of the battery house lid section.

According to the invention described in Structure 2, since the photographing device is composed of the battery house section which houses a battery detachably, and the battery house lid section which can be opened or closed to insert or remove battery, into or from the battery housing section, when the power ON/OFF detecting section senses the opening operation of the battery house lid section, the de-activated condition is detected, and therefore, it is possible to recognize the loading condition and the use condition of the recording medium, by using control information of the recording medium, even at the moment when the battery is inserted or removed.

Structure 3

The photographing device described in Structures 1 and 2, is further composed of a power supply switch to activate or de-activate the power supply, wherein when the power ON/OFF detecting section senses the de-activating condition of the power supply switch, the de-activating operation is sensed.

According to the invention described in Structure 3, since the photographing device described in Structures 1 and 2 is further composed of the power supply switch to activate or de-activate the power supply, when the power ON/OFF detecting section senses the de-activating operation of the power supply switch, the de-activating operation is sensed, and therefore, it is possible to recognize the loaded condition and the use condition of the recording medium, by using control information of the recording medium, even at the moment when the power supply switch is activated or deactivated.

Structure 4

The photographing device described in Structure 3, is further composed of:

a control information judging section to compare control information under the condition that the power supply switch is activated, which is generated by the control information generating section, and control information under the condition when the power supply switch was de-activated, which was memorized in the control information memorizing section, and a control information memorization control section, wherein when the control information judging section senses that both of the above-mentioned control information are the same, the control information memorization control section renovates a memorized content so that the control information which is generated under the condition that the power supply switch is activated, is memorized and preserved.

According to the invention described in Structure 4, since the photographing device described in structure 3, is further composed of:

the control information judging section to compare the control information under the condition that the power supply switch is activated, which is generated by the control information generating section, and the control information under the condition that the power supply switch is deactivated, which is memorized in the control information memorizing section, and the control information memorization control section, wherein when the control information judging section judges that content of both of the above-mentioned control information is the same, the control information memorization control section renovate the memorized content so that the control information, which is generated under the condition that the power supply switch is activated, is memorized and preserved, and therefore, when the power supply is activated again from the de-activated condition, and even at the moment when the loaded recording medium is changed, the changed condition is recognized immediately so that the waiting time until the moment when the changed recording medium can be used, is reduced.

Structure 5

The photographing device described in either one of Structures 1 to 4, is further composed of:

a recording medium house section which houses the recording medium detachably, and a recording medium detecting section to sense a loading/unloading condition of the recording medium in the recording medium house section, wherein the control information generating section generates loading/unloading information, based on the recording medium loading/unloading condition which is sensed by the recording medium detecting section, and the control information memorization section memorizes and preserves the loading/unloading information, under the condition that the power supply is de-activated.

According to the invention described in Structure 5, since the photographing device is further composed of:

the recording medium house section which houses the recording medium detachably, and the recording medium detecting section to sense the loading/unloading condition of the recording medium into the recording medium house section, wherein the control information generating section generates loading/unloading information, based on the recording medium loading/unloading condition which is sensed by the recording medium detecting section, and the control information memorization section memorizes and preserves the loading/unloading information, under the condition that the power supply is de-activated, and therefore, the loading condition of the recording medium is sensed precisely even at the moment when the power supply is activated or de-activated, and whereby it is possible to exactly perform the control process of each recording medium, and to improve the reliability of the photographing device.

Structure 6

The photographing device described in Structure 5, wherein the recording medium house section can house a plurality of recording media.

According to the invention described in structure 6, since the recording medium housing section can house a plurality of the recording media, the housed condition of a plurality of recording media can be sensed precisely even at the moment when the power supply is activated or deactivated, and the control process of a plurality of recording media is performed exactly Structure 7

The photographing device described in Structure 5 or 6, is further composed of:

a recording medium house lid section which can be opened or closed when the recording medium is loaded into or unloaded from the recording medium house section, wherein when the recording medium detecting section senses an opening/closed operation of the recording medium house lid section, loading or unloading of the recording medium can be sensed.

According to the invention described in Structure 7, since the photographing device is composed of the recording medium house lid section which can be opened or closed, when the recording medium is loaded into or unloaded from the recording medium house section, and when the recording medium detecting section detects an opening/closed operation of the recording medium house lid section, loading or unloading of the recording medium can be sensed, and therefore, by using the control information of the recording medium, it is possible to recognize the housed condition and the used condition of the recording medium, even at the moment when the recording medium house lid section is open or closed.

Structure 8

The photographing device described in Structure 7, wherein the recording medium house lid section can also be used for the battery house lid section which can be opened or closed for inserting or removing the battery, into or from the battery house section.

According to the invention described in Structure 8, since the recording medium house lid section can also be used for the battery house lid section which can be opened or closed for inserting or removing the battery, into or from the battery house section, the insertion or removal of the recording medium and the battery is sensed precisely, and it is possible to perform the control process of the recording medium precisely, even at the moment when the power supply is activated or de-activated by the opening or closing of the battery house lid section.

Structure 9

The photographing device described in either one of Structures 1 to 8, which is further composed of:

an abnormal condition detecting section which senses an abnormal condition about the photographing process of the photographing device, and an abnormal condition disposing section which interrupts the photographing process when the abnormal condition is sensed by the abnormal condition detecting section, and which voids the control information of the recording medium used for the photographing process, memorized in the control information memorizing section.

According to the invention described in Structure 9, since the photographing device is further composed of the abnormal condition detecting section which senses abnormal conditions in the photographing process of the photographing device, and the abnormal condition disposing section which interrupts the photographing process when abnormal conditions are detected by the abnormal condition detecting section, and which voids the control information of the recording medium used for the photographing process, memorized in the control information memorizing section, when the power supply is reactivated from an abnormal interrupt condition, it is possible to enter automatically an initializing process or a formatting process of each loaded recording medium, and the operational burden of the user during abnormal interruption can be reduced.

DETAILED DESCRIPTION OF THE PREFERRED EMBODIMENT

Figure 1:
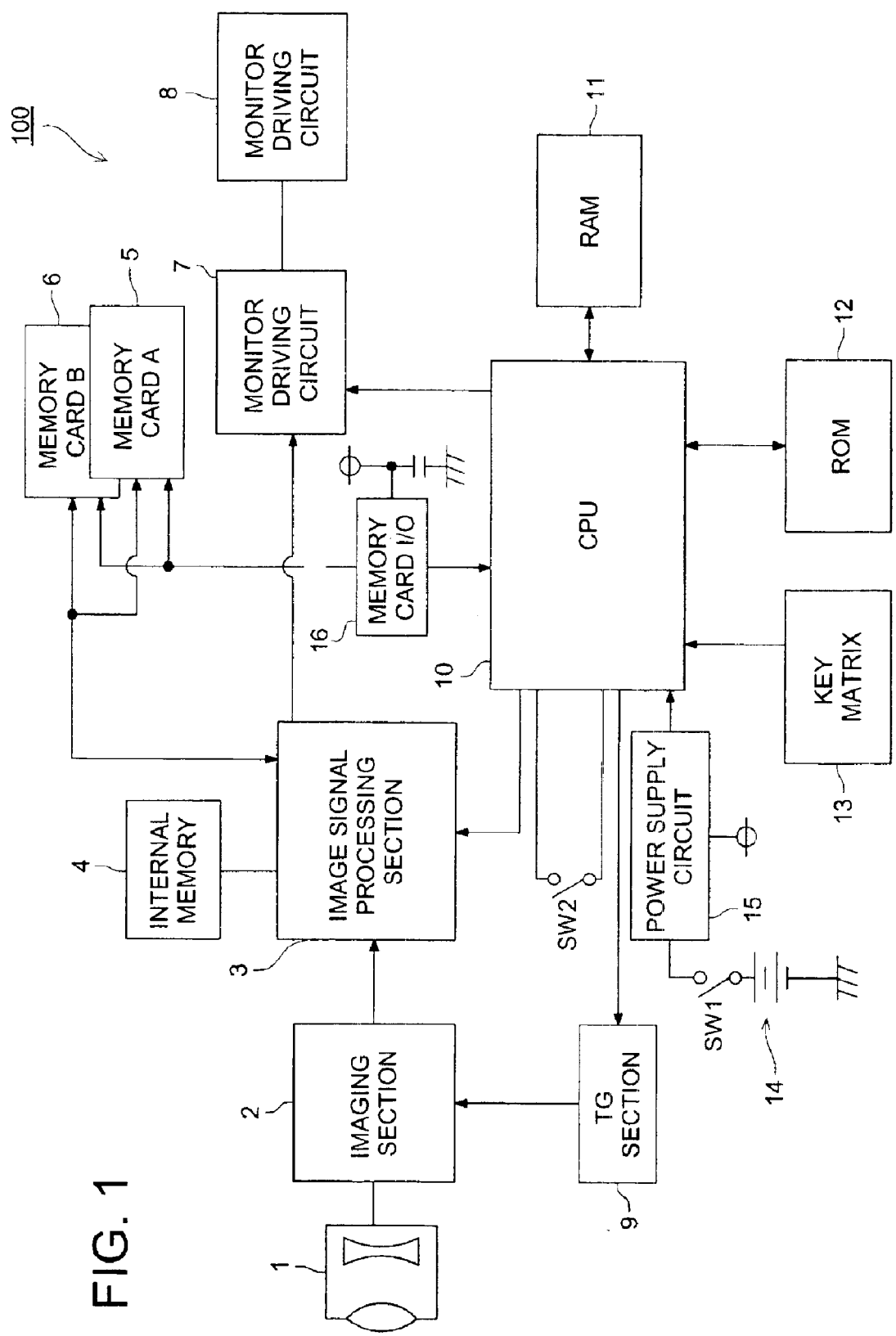
FIG. 1 is a block diagram showing the internal construction of digital camera 100 of the embodiment to which the present invention applies.

The details of the present invention will be described while referring to the drawings.

Figure 2:
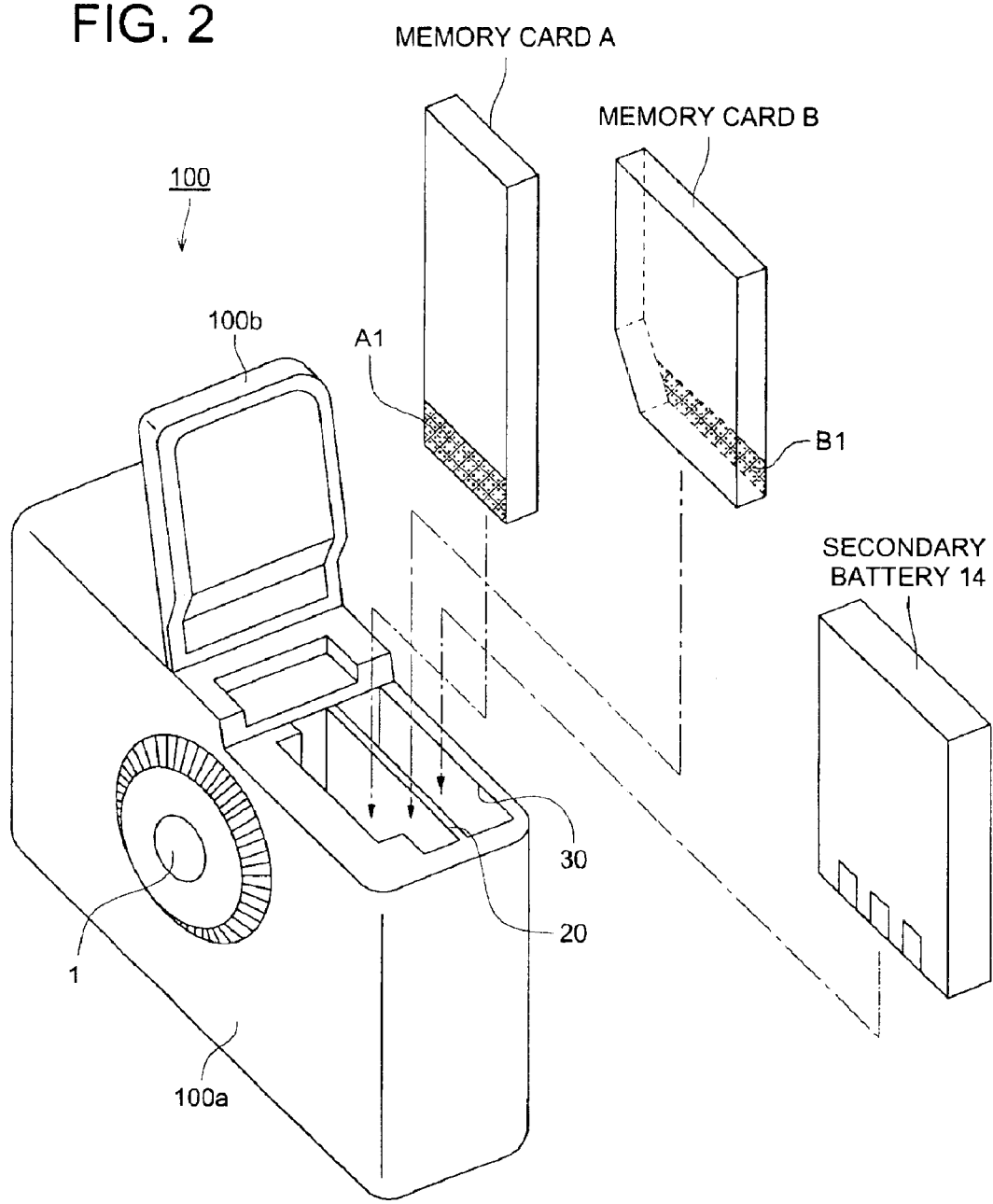
FIG. 2 is a perspective view of digital camera 100 shown in FIG. 1.
Figure 3:
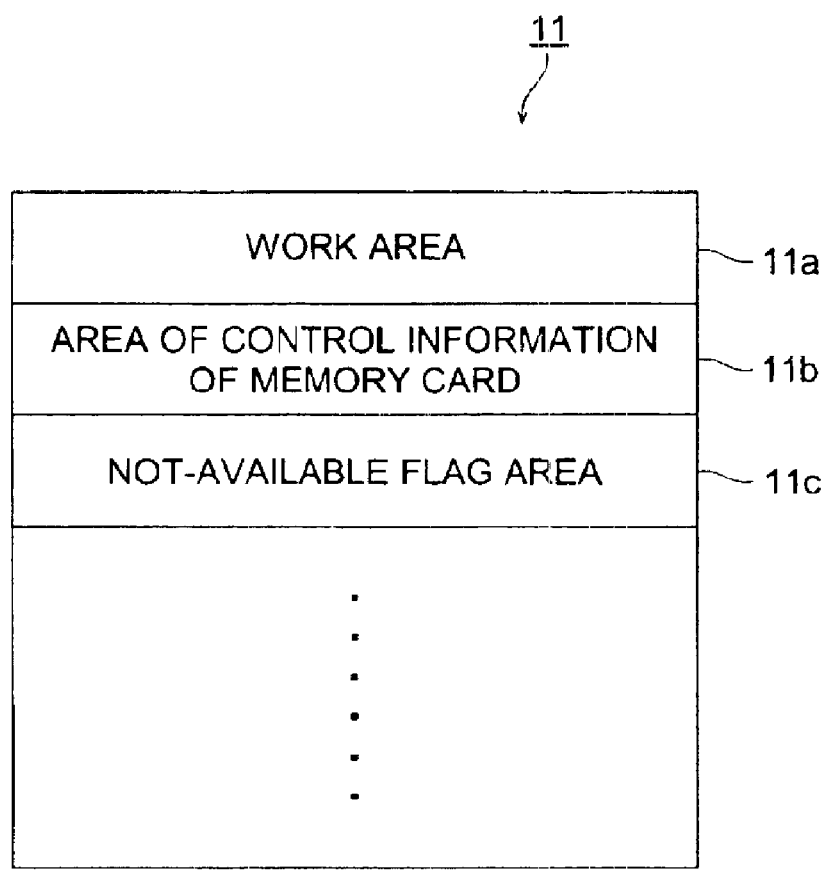
FIG. 3 shows the memory structure of RAM 11 shown in FIG. 1.

FIGS. 1 to 3 show an embodiment of the digital camera to which the present invention applies.

Firstly, the structure will be described.

In FIG. 1, digital camera 100 is composed of lens unit 1, imaging section 2, image signal processing section 3, internal memory 4, memory card A 5, memory card A 6, monitor driving circuit 7, liquid crystal monitor 8, T/G (timing generator) section 9, CPU 10, RAM 11, ROM 12, key matrix 13, secondary battery 14, power supply switch SW1, and lid opening/closing switch SW2.

Further, as shown in the perspective view in FIG. 2, digital camera 100 has lens unit 1 at the front of body 100a, memory slot 20 at the bottom of body 100a, which can simultaneously house two types of memory cards, memory card A and memory card B, whose shapes are different, battery slot 30 to house secondary battery 14, slot opening/closing lid 100b which is opened or closed when memory card A, memory card B and secondary battery 14 are inserted or removed.

When the user opens or closes slot open-closing lid 100b, shown in FIG. 2, it is possible to insert or remove memory card A and memory card B into or from memory slot 20, and to insert or remove secondary battery 14 into or from battery slot 30. When slot opening/closing lid 100b is opened, electrical connection between secondary battery 14 and an electrical terminal section (not illustrated) is opened so that a de-activated condition of the electric power results.

When memory card A and memory card B are inserted into memory slot 20, terminal section A1 of memory card A and terminal section B1 of memory card B contact electrically to respective connecting terminals (not illustrated), which are structured so that terminal sections A1 and B1 face each other.

The attached or detached condition of memory card A and memory card B is detected by below-mentioned memory card I/O 16, and the detected signal is outputted to CPU 10. Further, recording, reading and erasing of the image data in memory card A and memory card B are performed by CPU 10 through memory card I/O 16.

Lens unit 1 is composed of a lens group to capture optical images of a subject, and features a diaphragm to adjust the amount of light rays passing through the lens group and to adjust exposure. Optical images of the subject which are brought into focus in the optical path of lens unit 1, is photo-electrically converted by CCD (charge coupled device), which is not illustrated, in imaging section 2, and image signals (analog signals) which are photo-electrically converted are outputted to image signal processing section 3. Imaging section 2 controls timing of the photo-electric conversion of CCD, synchronized with timing signals inputted from T/G section 9.

Image signal processing section 3 performs various kinds of image processing such as correction of sensitivity on the image signals inputted from imaging section 2, and forms predetermined image signals, then converts the formed signals from analog signals to digital signals. Following image display instructions from CPU 10, image signal processing section 3 outputs the analog-to-digital converted image data, and following image recording instructions from CPU 10, image signal processing section 3 stores the analog-to-digital converted image data in internal memory 4, and using a predetermined image compressing method, compresses the analog-to-digital converted image data, then the analog-to-digital converted image data are recorded in memory card A 5 or B 6. The user may select which memory card A 5 or B 6 the data are to be recorded in.

Following image readout instructions from CPU 10, image signal processing section 3 reads out the compressed data of the instructed images from memory card A 5 or B 6, extracts the data using internal memory 4, and outputs the data to monitor driving circuit 7 to show the images which have been read out.

Internal memory 4 temporarily stores the image data under the process which are inputted from image signal processing section 3.

Memory card A 5 and memory card B 6 are the memory means to record the image, representing semiconductor memory such as flash memory. Image data, which are compressed by image signal processing section, are recorded in memory A 5 and memory B 6. The user is able to attach or detach memory card A 5 and memory card B 6, after which CPU 10 controls initialization, formatting, recording of the image data, and subsequently erasing of the image data in the internal memory area of memory A 5 and memory B 6.

Following the various kinds of the display instructions from CPU 10, monitor driving circuit 7 converts the image data, inputted from image signal processing section 3, the imaging mode, and the operation display data, necessary for the various settings, to the image display signals, and thereby monitor driving circuit 7 drives liquid crystal monitor 8, by using the image display signals, so that liquid crystal monitor 8 displays the captured images and the operating screen.

Liquid crystal monitor 8 is composed of a color liquid crystal panel, and is driven and controlled by monitor driving circuit 7, to display the captured images and the operating screen.

T/G (timing generator) section 9 generates predetermined timing signals based on the instructions from CPU 10, and outputs them to imaging section 2.

CPU (central processing unit) 10 reads out on a work area in RAM 11, various kinds of application programs, stored in ROM 12, for the various functions for digital camera 100, and performs the various processes such as imaging processes and memory card processes based on the programs, and displays the processed results on liquid crystal monitor 8.

Further, CPU 10 controls initialization, formatting, recording operation of the image data, and subsequent erasing operation of the image data, of the internal memory area of memory card A 5 and memory card B 6. Still further, CPU 10 generates memory card control information such as loading/unloading information of memory card A 5 and memory card B 6 into memory slot 20, completed initializing information of the internal memory area, completed formatting information of the internal memory area, and FAT (file allocation tables) information showing the used block area and open block areas, which CPU 10 memorizes in RAM 11.

Still further, CPU 10 generates memory card loading/unloading information, based on memory card loading/unloading detection signals inputted from memory I/O 16. Memory I/O 16 can work even when the power supply is in the OFF condition (including turning off of power supply switch SW1, and opening of slot opening/closing lid 100*b* shown in FIG. 2). CPU 10 also generates memory card control information of loaded memory cards A 5 and B 6, and stores it in RAM 11.

Still further, when the power supply is activated again (including turning on of power supply switch SW1, and closing of slot opening/closing lid 100*b* shown in FIG. 2), CPU 10 recognizes that memory card control information was stored in RAM 11 under the power OFF condition, generates memory card control information of loaded memory cards A 5 and B 6, and compares that with memory card control information which was stored in RAM 11 when the power was turned off, and then judges whether loaded memory cards A 5 and B 6 are the same as the cards which were used when the power was turned off.

If the memory card control information while the power OFF and that while the power ON are all identical, CPU 10 preserves the memory card control information which were memorized in RAM 11 when the power supply were turned off, and performs the control processing of memory cards A 5 and B 6, based on the memory card control information, generated when the power was turned off. On the other hand, if the memory card control information under power OFF and power ON are not identical, CPU 10 renews area 11*b* of memory card control information in RAM 11, based on memory card control information generated when the power was turned on, and performs the control processing of memory cards A 5 and B 6, based on the memory card control information, generated when the power was turned on.

Still further, when CPU 10 detects an abnormal process while digital camera 100 performs the photographing process or any other process, CPU 10 interrupts any process in progress, and sets a not-available flag showing that memory card control information stored in RAM 11 is not effective, in regard to memory card A 5 and memory card B 6 inserted in memory slot 20, and CPU 10 memorizes the not-available flag in RAM 11.

When the power supply is turned on again (that is, turning on of power supply switch SW1, and closing of slot opening/closing lid 100*b* shown in FIG. 2), from the abnormal interrupted condition, CPU 10 recognizes that the not-available flag signal is stored in RAM 11, and performs an initialization process and formatting process of memory cards A 5 and/or B 6.

CPU 10 functions to control the information generating means, control information judging means, control information memorization control means, abnormal condition detecting means, and abnormal condition disposing means.

RAM (random access memory) 11 is a nonvolatile semiconductor memory and features: as shown in FIG. 3, work area 11*a* which temporarily memorizes programs, data, and memory card control information, all being processed by CPU 10, memory card control information area 11*b* which preserves memory card control information, while the power supply of digital camera 100 is turned off, and not-available flag area 11*c* which stores the not-available flag signal during an abnormal interruption of digital camera 100.

In the present embodiment, when the power supply of digital camera 100 is turned off, memory card control information, which was generated by CPU 10 just before it was turned off, is stored and preserved in memory card control information area 11*b* in RAM 11, and the not-available flag, set by CPU 10 during the abnormal interruption of digital camera 100, is stored and preserved in not-available flag area 11*c* in RAM 11. RAM 11 functions to control the information memorizing means.

ROM (read only memory) 12 is a programmable semiconductor memory, and stores various kinds of the application programs, which are executed by CPU 10, related to the various kinds of functions of digital camera 100.

Key matrix 13 features the various kinds of operation switches such as a release switch, a mode switch to change the functions, and a menu switch to select the settings, and when the switch is pressed, key matrix 13 generates the appropriate signal and outputs it to CPU 10.

Secondary battery 14 is a chargeable battery which can be used repeatedly. When secondary battery 14 is inserted into battery slot 30 shown in FIG. 2, and slot opening/closing lid 100*b* is closed, secondary battery 14 is electrically connected to a power supply terminal section (not illustrated) formed in battery slot 30. The output voltage of secondary battery 14 is supplied to power supply circuit 15 through power supply switch SW1 illustrated in FIG. 1.

Power supply circuit 15 functions to convert the voltage supplied from secondary battery 14 to the voltages necessary for each block shown in FIG. 1, and supplies the required voltages to each block.

Even when the power supply is OFF (or even when secondary battery 14 is removed), memory card I/O 16 can be activated by a mass capacitor which is connected to a power supply line, and thereby, memory card I/O 16 functions to detect the loading/unloading conditions of memory cards A 5 and B 6 in memory slot 20, and outputs loading/unloading detecting signals to CPU 10, and also features a data I/O function which performs recording, reading, and subsequently erasing of the image data between CPU 10 and memory cards A 5 and B 6.

Memory card I/O 16 functions as the recording medium detecting means.

Power supply switch SW1 is operated by the user, and makes contact between the output section of secondary battery 14 with the input section of power supply circuit 15, by operation of the ON switch, and further, breaks the contact between the output section of secondary battery 14 and the input section of power supply circuit 15, by operation of the OFF switch.

Lid opening/closing switch SW2 is driven with the opening/closing operation of slot opening/closing lid 100*b* at the option of the user, and when slot opening/closing lid 100 is closed, lid opening/closing switch SW2 is turned ON, while when slot opening/closing lid 100 is opened, lid opening/closing switch SW2 is turned OFF.

Power supply switch SW1 and lid opening/closing switch SW2 function as the operation power detecting means.

Next, the operation of the present embodiment will be described.

As the ordinary function of digital camera 100, based on the operational signals inputted from key matrix 13, CPU 10 reads out in the work area of RAM 11, the various kinds of application programs, stored in ROM 12, related to the various kinds of the functions as digital camera 100, further, CPU 10 performs the various kinds of processing such as the photographing process, and the memory card process, in accordance with the programs, and displays the processed results on liquid crystal monitor 8.

Still further, CPU 10 generates memory card loading/unloading information, based on the memory card loading/unloading detection signals inputted from memory card I/O 16. Memory card I/O 16 can work even when the power supply is in the OFF condition (that is, turning off of power supply switch SW1, and opening of slot opening/closing lid 100b shown in FIG. 2). CPU 10 also generates memory card control information of loaded memory cards A 5 and B 6, and stores them in RAM 11.

Still further, when the power supply is activated again (that is, turning on of power supply switch SW1, and closing of slot opening/closing lid 100b shown in FIG. 2), CPU 10 recognizes that memory card control information was stored in RAM 11 under the power OFF condition, then generates memory card control information of loaded memory cards A 5 and/or B 6, and compares it with memory card control information which was stored in RAM 11 when the power was turned off, after which CPU 10 judges whether loaded memory cards A 5 and/or B 6 are the same as the cards which were used when the power was turned off.

If the memory card control information during the power OFF and the power ON are all identical, CPU 10 preserves the memory card control information which were stored in RAM 11 when the power supply were turned off, and performs the control processing of memory cards A 5 and B 6, based on memory card control information, generated when the power was turned off.

On the other hand, if the memory card control information under power OFF and power ON are not identical, CPU 10 renews area 11b of memory card control information in RAM 11, based on memory card control information generated when the power was turned on, and performs the control processing of memory cards A 5 and B 6, based on the memory card control information, generated when the power was turned on.

Still further, when CPU 10 detects an abnormal process while digital camera 100 performs the photographing process or any other process, CPU 10 interrupts any process in progress, and sets a not-available flag showing that memory card control information stored in RAM 11 is not effective, in regard to memory cards A 5 and B 6 inserted in memory slot 20, and CPU 10 memorizes the not-available flag in RAM 11.

When the power supply is turned on again (that is, turning on of power supply switch SW1, or closing of slot opening/closing lid 100b shown in FIG. 2) from the abnormal interrupted condition, CPU 10 recognizes that the not-available flag is stored in RAM 11, and performs the initialization process and formatting process of memory cards A 5 and B 6 which have been inserted.

As mentioned above, according to digital camera 100 of the present embodiment, concerning the two types of memory cards, memory cards A 5 and B 6, memory card control information of memory cards A 5 and B 6, which were inserted under power OFF condition (that is, turning off of power supply switch SW1, or opening of slot opening/closing lid 100b shown in FIG. 2) are generated and stored in RAM 11, and when the power is turned on again (that is, turning on of power supply switch SW1, or closing of slot opening/closing lid 100b shown in FIG. 2), memory card control information are generated again, and then, memory card control information under the power OFF condition and power ON condition are compared, when they are the same, the control process of memory cards A 5 and B 6 are performed, based on memory card control information under power OFF condition, stored in RAM 11.

Accordingly, when the power supply is turned on again, it is possible to reduce a rise time of the control processing of memory cards A 5 and B 6 which have been inserted, and to reduce the time until the preparation of photography is completed, and thereby, it is possible to improve the deterioration of operational performance for the process of the memory card, and the handling performance for the user such as a photo opportunity. As a result, it is possible to improve both functionality and operability of the digital camera.

Still further, according to digital camera of the present embodiment, when the abnormal process is detected during the photographing process or any other processes, the process is interrupted, and the not-available flag is set, which shows that memory card control information stored in RAM 11 is not effective, concerning memory cards A 5 and/or B 6 inserted in memory slot 20, and the not-available flag signal is stored in RAM 11.

When the power supply is turned on again (that is, turning on of power supply switch SW1, and closing of slot opening/closing lid 100b shown in FIG. 2) from the abnormal interrupted condition, the initialization process and formatting process of memory cards A 5 and/or B 6 which have been inserted, are performed.

Accordingly, when the power supply is turned on again from the abnormal interrupted condition, the initialization process and formatting process of memory cards A 5 and/or B 6 which have been inserted, are performed automatically, and thereby, the operational burden of the user for abnormal interruptions can be reduced.

According to digital camera 100 of the present embodiment, since installed is memory card I/O 16 which is active even when the power supply is not activated, and further since memory card I/O 16 features loading/unloading detection function by which the loading/unloading detection signals of memory cards A 5 and B 6 on memory slot 20 are outputted to CPU 10, it is possible to precisely detect the loading condition of memory cards A 5 and B 6, even when the power supply is turned on or off, and therefore, it is possible to perform the generating process, comparing process, and renewal process of memory card control information, which improve the reliability of digital camera 100.

In digital camera 100 mentioned above, the case is shown in which two types of memory card A 5 and B 6 are installed, however this invention is not limited to the number of installed memory cards, or to the types of memory cards.

The present invention is not limited to only digital camera 100 shown in the above-mentioned embodiment, and it is possible to apply the present invention to video cameras having at least a memory card and an optional battery power supply.

EFFECTS OF THE INVENTION

Based on the invention described in Structure 1, when the power supply is reactivated, it is possible to recognize the installation condition and use condition of the recording medium, by using the control information which was memorized while the power supply was de-activated, and thereby, it is possible to reduce the processing time interval between the moment of a power supply-activation and the image capturing moment.

Based on the invention described in Structure 2, it is possible to recognize the loading condition and the use condition of the recording medium, by using control information of the recording medium, even at the moment when the battery is inserted or removed.

Based on the invention described in Structure 3, it is possible to recognize the loaded condition and the use condition of the recording medium, by using control information of the recording medium, even at the moment when the power supply switch is activated or de-activated.

Based on the invention described in Structure 4, when the power supply is re-activated from the de-activated condition, and even at the moment when the loaded recording medium is changed, the changed condition is recognized immediately so that the waiting time until the moment when the changed recording medium can be used, is shortened.

Based on the invention described in Structure 5, the loading condition of the recording medium is sensed precisely, even at the moment when the power supply is activated or de-activated, and whereby it is possible to perform the control process of each recording medium exactly, and to improve the reliability of the photographing device.

Based on the invention described in structure 6, the housed condition of a plurality of recording media can be sensed precisely even at the moment when the power supply is activated or de-activated, and the control process of a plurality of recording media is performed precisely.

Based on the invention described in Structure 7, by using the control information of the recording medium, it is possible to recognize the housed condition and the used condition of the recording medium, even at the moment when the recording medium house lid section is open or closed.

Based on the invention described in Structure 8, the insertion or removal of the recording medium and the battery is sensed precisely, and it is possible to perform the control process of the recording medium precisely, even at the moment when the power supply is activated or de-activated by the closing or opening of the battery house lid section.

Based on the intervention described in Structure 9, when the power supply is reactivated from an abnormal interrupt condition, it is possible automatically enter an initializing process or a formatting process of each loaded recording medium, and the operational burden of the user during abnormal interrupt can be reduced.

What is claimed is:

1. A digital camera, comprising:
    a photographing device to photograph an object and to output image signals of the photographed object;
    a memory section in which a particular removable electronic memory selected from a plurality of removable electronic memories is detachably loaded, to store the image signals;
    a power source to supply electric power to the photographing device and the removable memory;
    an operation detecting device to detect an ON operation of the power source and an OFF operation of the power source;
    a control section to control the particular removable electronic memory to store the image signals based on memory control information including file allocation data and to generate the memory control information in accordance with a file allocation condition of the particular removable electronic memory loaded in the memory section; and
    a memory to store the generated memory control information in a memory control information storing area;
    wherein immediately after an OFF operation is detected, the memory memorizes the memory control information and retains, during the OFF condition, the memory control information corresponding to the particular removable electronic memory loaded in the memory section at the time the OFF operation is detected, and when an ON operation is detected after an OFF operation, the control section checks the memory control information and,
        when the memory control information generated after the ON operation is different from that stored in the memory immediately after the OFF operation, the control section conducts an automatic renewal operation for the memory control information storing area of the memory based on the memory control information generated after the ON operation, and controls said removable electronic memory based on the memory control information stored in the memory control information storing area as a result of the automatic renewal operation, and
        when the memory control information generated after the ON operation is the same as that stored in the memory after the OFF operation, the control section controls the removable electronic memory based on the memory control information stored immediately after the OFF operation without conducting the automatic renewal operation.

2. The digital camera of claim 1, further comprising:
    a battery house section in which a particular removable battery is detachably loaded;
    a lid to open or close the battery house section, wherein when the lid closes the battery house section, the particular removable battery is electrically connected with the power source, and when the lid opens the battery house section, the removable battery is electrically disconnected from the power source, and
    wherein the operation detecting device includes a lid switch which detects the opening and closing of the lid.

3. The digital camera of claim 1, further comprising:
    a power source switch to perform the ON operation and the OFF operation, wherein the operation detecting device detects the ON operation and the OFF operation of the power source switch based upon whether the power source switch is switched ON or OFF.

4. The digital camera of claim 1, wherein the particular removable electronic memory includes a memory control information area for storing memory control information specific to said particular removable electronic memory and wherein, when the memory control information generated after the ON operation is different from that before the ON operation, the control section conducts the automatic renewal operation based on said memory control information stored in said memory control information area of the particular removable electronic memory.

5. The digital camera of claim 2, wherein the memory section includes a memory house section in which the particular removable memory is detachably loaded and a load/unload detecting section to detect whether the particular removable memory is loaded in the memory house section and to generate a load signal or an unload signal based upon whether the particular removable memory is loaded or unloaded; and wherein the digital camera further comprises a backup power source to supply power to the load/unload detecting section during the OFF condition so that the load/unload detecting section may detect whether the particular removable memory is loaded in the memory house section during the OFF condition.

6. The digital camera of claim 5, wherein the memory house section is adapted to store at least a second removable memory selected from said plurality of removable memories.

7. The digital camera of claim 5, further comprising:

a lid to open or close the memory house section, wherein when the lid closes the memory house section with the particular removable memory therein, the particular removable memory is loaded, and when the lid opens the memory house section, the particular removable memory can be unloaded, and wherein the load/unload detecting section includes a lid switch which detects opening and closing of the lid.

8. The digital camera of claim 7, wherein the lid to open or close the memory house section is also the lid that opens and closes the battery house section.

9. The digital camera of claim 1, wherein the particular removable memory is a flash memory.

10. The digital camera of claim 1, further comprising:

an abnormal condition detecting section to detect an abnormal condition in the digital camera, and an abnormal condition disposing section to interrupt photographing when the abnormal condition detecting section detects an abnormal condition and to invalidate the memory control information stored in the particular removable memory.

* * * * *